Patented July 13, 1926.

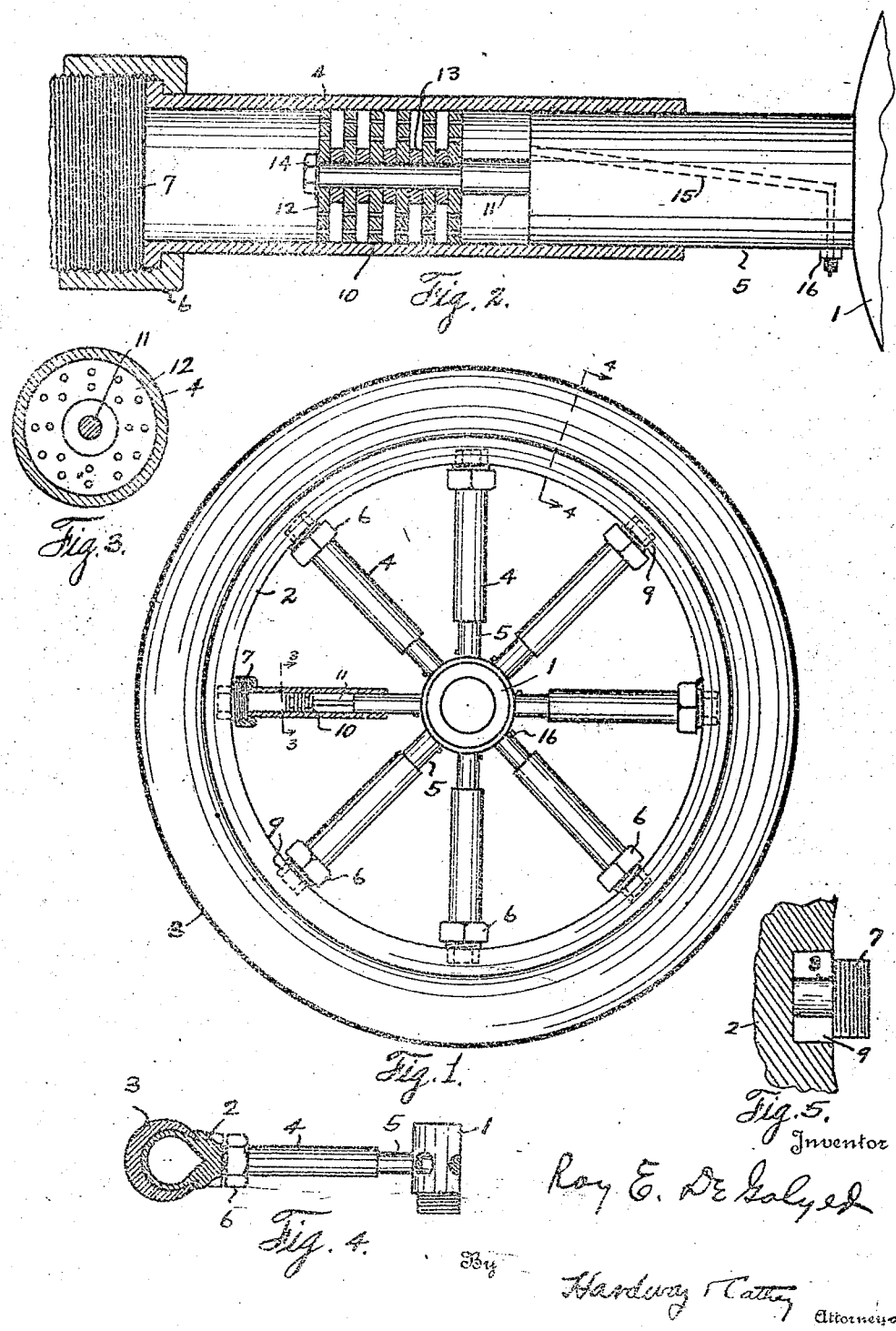

1,592,183

UNITED STATES PATENT OFFICE.

ROY EARNEST DE GOLYER, OF HOUSTON, TEXAS.

RESILIENT WHEEL.

Application filed September 5, 1922. Serial No. 586,154.

This invention relates to new and useful improvements in a resilient wheel.

One object of the invention is to provide a wheel of the character described specially designed for use on motor vehicles, and formed with sectional spokes, one section forming a cylinder and the other section telescoping within the cylinder and carrying a plunger which operates against fluid in the cylinder which forms a cushion thus giving to the wheel a certain amount of resiliency or yieldability to absorb the shock incident to the movement of the vehicle.

With the above and other objects in view the invention has particular relation to certain novel features of construction, operation and arrangement of parts, an example of which is given in this specification and illustrated in the accompanying drawings, wherein:—

Figure 1 is a side elevation of the wheel partially in section.

Figure 2 is an enlarged sectional view of one of the spokes.

Figure 3 is an enlarged sectional view of one of the spokes taken on the line 3—3 of Figure 1.

Figure 4 is a fragmentary sectional view of the wheel taken on the line 4—4 of Figure 1 and, Figure 5 is a enlarged fragmentary view of the wheel felly showing the connection of the outer end of the spoke thereto.

In the drawings, the numeral 1 designates the hub of the vehicle from which the spokes radiate, the numeral 2 designates the felly of the wheel which is preferably formed of metal and is hollow, and surrounding this felly there is a tire 3, preferably formed of solid rubber. Each spoke is formed of two sections, an outer and an inner section, designated by the numerals 4 and 5 respectively. The outer section 4 is tubular forming a cylinder, and connected to the outer end of each cylinder by the flanged union 6 there is a plug 7 having an outwardly extending stud 8 integral therewith which works in an oblong slot 9 in the inside of the felly. Each inner section 5 telescopes within the corresponding cylinder 4 and the plunger 10 works in each cylinder and is connected to and spaced from the spoke section 5, by means of a connecting rod 11. Each plunger is formed of a plurality of perforated discs 12 between which are the spacers 13 all clamped on the rod 11, by means of the clamp nut 14. There is a duct 15 leading through each spoke section 5 whose outer end enters the corresponding cylinder 4 and whose inner end is turned outwardly to the side of the spoke and provided with a pump connection 16.

What I claim is:—

1. A cylinder including a hub, a felly, radiating spokes connected to the hub and felly, each formed of two sections, one formed rigidly with the hub, one of said sections being formed into a fluid containing cylinder, a stud carried by the outer end of each cylinder, the felly having oblong slots in which said studs are worked circumferentially, a plunger in said cylinder having ducts provided for the passage of fluid from each side of said plunger to the other, the other spoke section telescoping within said cylinder and being connected to said plunger, said last mentioned spoke section having a fluid conduit leading through it from said cylinder and terminating in the side of the spoke section and provided with a pump connection.

2. In combination a wheel including a hub, a felly, radiating spokes rigidly connected to the hub at one end, and at their other ends being provided with adjustable studs, the felly having oblong slots forming bearings in which said studs are adapted to move circumferentially, each spoke including two sections, one of which is tubular forming a cylinder a plunger in said cylinder having fluid ducts through which the fluid may pass from one side of the plunger to the other, the other spoke section telescoping within said cylinder and connected to the plunger and provided with a valve controlled passageway through which fluid may be forced into the cylinder.

In testimony whereof I have signed my name to this specification.

ROY EARNEST DE GOLYER.